US006420965B1

(12) United States Patent
Edgren et al.

(10) Patent No.: US 6,420,965 B1
(45) Date of Patent: Jul. 16, 2002

(54) VIBRATOR

(75) Inventors: Anders Edgren, Stockholm (SE); Magnus Hansson, Apex, NC (US); Mohammad Vatankhah, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/516,189

(22) Filed: Mar. 1, 2000

(30) Foreign Application Priority Data

Mar. 17, 1999 (SE) .............................................. 9900957

(51) Int. Cl.[7] .................................................. H04B 3/36

(52) U.S. Cl. ..................... 340/407.1; 340/7.6; 340/965; 340/388.4

(58) Field of Search ............................... 340/407.1, 7.6, 340/965, 388.4

(56) References Cited

U.S. PATENT DOCUMENTS

| | | | | |
|---|---|---|---|---|
| 4,943,956 A | * | 7/1990 | Noro | 367/137 |
| 5,436,622 A | | 7/1995 | Gutman et al. | 340/407.1 |
| 5,754,096 A | | 5/1998 | Muto et al. | 340/407.1 |

FOREIGN PATENT DOCUMENTS

| | | |
|---|---|---|
| GB | 2290364 A | 12/1995 |
| JP | 10-51839 A | 2/1998 |

OTHER PUBLICATIONS

Patent Abstracts of Japan, Abstract of JP–51839 A (SAITAMA NIPPON DENKI KK), Feb. 20, 1998 (20.02.98).

* cited by examiner

*Primary Examiner*—Donnie L. Crosland
(74) *Attorney, Agent, or Firm*—Nixon & Vanderhye P.C.

(57) ABSTRACT

In a method of controlling a vibrator, the vibrator is first driven towards a first frequency during a first interval and then is driven towards a second frequency during a second interval. In a preferred embodiment the first frequency is higher than the lowest resonance frequency of the vibrator and the vibrator is then allowed to reduce the frequency to a frequency lower than the resonance frequency. By letting the frequency vary in a pulsating manner in the vibrating device, the vibration can be sensed more easily by a human, and thereby making it possible to use a very small mass in the vibrating device, which therefore can be made using a small weight, while still making it possible to sense the vibration.

27 Claims, 2 Drawing Sheets

VIBRATOR

TECHNICAL FIELD

The present invention relates to a method and a device for generating a vibrating signal.

BACKGROUND OF THE INVENTION AND PRIOR ART

In the mobile telephones and pagers of today, a silent alert signal is often desired. For example, in the theatre or in the restaurant, a ring signal can disturb other persons.

Therefore, some mobile telephones or pagers are equipped with a silent alert signal generator for generating a silent alert signal, such as a light signal or a vibration signal. In the case when the silent alert signal is generated as a vibrating signal, a vibrator must be provided.

A vibrator usually consists of a small electric motor and an eccentric loaded excitation mass. The vibration level of such a vibrator is not proportional to the speed of the motor. Instead, since the vibrator is placed in a telephone or a pager it will be suspended therein, and will thus form a mass-spring-system having a resonance frequency. Therefore, the maximum vibration level will be obtained when the motor speed coincides with the resonance frequency.

However, since the only known parameter in the resonance system is the mass of the pager or telephone, there is a problem of finding the resonant frequency in order to drive the motor to this frequency and thereby obtaining a maximum vibration level. This is particularly true when the mobile telephone or the pager is placed in a pocket or the like, which then forms a combined device-environment resonance system having many unknown parameters.

In order to drive the motor to a suitable speed, a control circuit can be used. A sensor is used to find the frequency corresponding to the maximum resonance level. The control system is then set to drive the motor to a speed corresponding to the resonance frequency. An advantage of using such a control system is that the system is able to compensate for a change in the resonance frequency. However, the use of a control system will make the vibrating device more expensive.

Another, more straight forward, solution to the problem of obtaining a high vibration level, is to increase the radius and hence the mass of the excitation lump. The use of a larger mass is however not desired in today's mobile telephones and pagers, where requirements on low weight often exist.

Also, in U.S. Pat. No. 5,436,622 a vibrating signal device is disclosed. The object of U.S. Pat. No. 5,436,622 is to obtain vibration frequencies for the device and in particular the optimum vibration frequency using a feed-back circuit. In order to find the optimum frequency, a signal corresponding to a number of frequencies is fed to the device. Also, the device is capable of varying the frequency generated by the vibrating signal in order to make it possible to generate distinctive tactile sensations. The device can however not easily be made of very low weight and at the same time provide a vibrating signal that is strong enough for many applications, such as mobile telephones and pagers.

SUMMARY

It is an object of the present invention to provide an improved vibrating device, which overcomes the problems outlined above, and which can provide a vibrating signal which is easy to sense and which at the same time makes it possible to keep the vibrating device very small and of low weight.

This object is obtained by a method of controlling a vibrator wherein the vibrator first is driven towards a first frequency during a first interval and then is driven towards a second lower frequency during a second interval. The first frequency is higher than the resonant frequency of the vibrating device, and the second frequency is lower than the resonant frequency of the device. A vibrating device is arranged to operate according to the method.

In a preferred embodiment the first frequency is higher than the lowest resonance frequency of the combined vibrating system formed by the vibrator suspended in a device, such as a mobile telephone or a pager and the environment where it is placed, such as a pocket or a belt holder or the like.

The vibrator is then allowed to reduce the frequency to a frequency lower than the resonance frequency of the combined system. Particularly the second frequency is significantly lower than the first frequency such as in the range 25%–75%, or even lower, for example less than 10% of the first frequency.

By letting the frequency vary in a pulsating manner in the vibrating device, it has surprisingly been shown that the vibration can be sensed more easily by a human, and thereby making it possible to use a very small mass in the vibrating device, which therefore can be made using a small weight, while still making it possible to sense the vibration.

In some applications, it may be advantageous to let the pulsating power signal applied to the motor of the vibrator only drive the motor to a speed corresponding to a maximum frequency, which is significantly lower than a resonance frequency of the vibrator or the combined vibrator-environment system.

Also, the method of controlling a vibrator is not limited to a particular type of vibrator, but can be used for controlling any existing vibrator in order to make the vibration easier to sense.

BRIEF DESCRIPTION OF THE DRAWINGS

The present invention will now be described in more detail by way of non-limiting examples and with reference to the accompanying drawings, in which.

DESCRIPTION OF PREFERRED EMBODIMENTS

Figure 1:
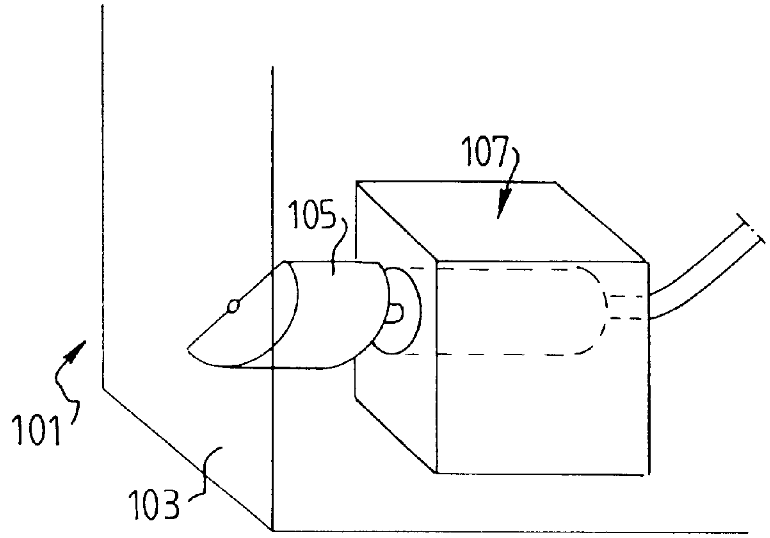
FIG. 1 is a general view of a vibrating device.

In FIG. 1, a general view of a vibrating device 101 of conventional type. The device 101 comprises a housing 103, a rotating eccentric mass 105, and an electrical motor 107. When the motor drives the eccentric mass, the device starts to vibrate. This vibration can then be sensed by a human.

Figure 2:
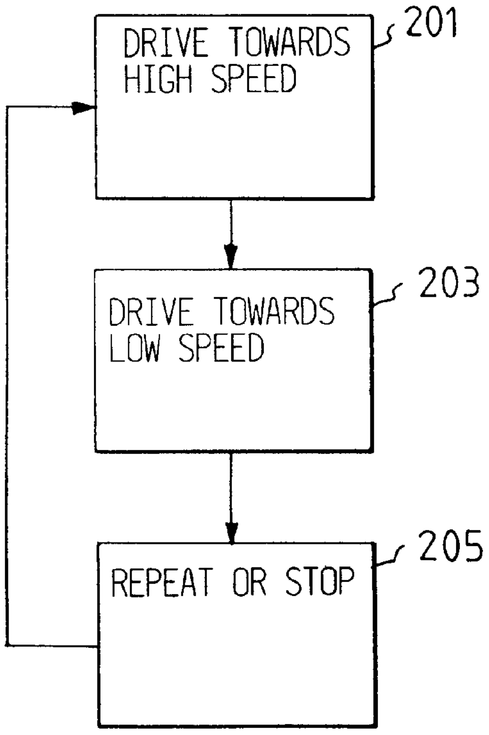
FIG. 2 is a flow chart illustrating steps carried out when controlling a vibrator

In FIG. 2, a flow chart of the steps carried out when driving a vibrating device, such as the device shown in FIG. 1. Thus, first in a step 201 the eccentric mass of the vibrating device is driven to a first speed corresponding to a high frequency above a resonance frequency by means of applying power to the motor in the vibrating device.

Thereupon, the frequency is allowed to drop, preferably by letting the motor of the vibrating device freewheel, i.e. disconnecting the power to the motor. In particular the frequency is allowed to drop to a frequency lower than the resonance frequency of the combined vibrating system, where the combined vibrating system is formed by the vibrator suspended in a device, such as a mobile telephone or a pager and the environment where it is placed, such as a pocket or a belt holder or the like.

Particularly, the second frequency is significantly lower than the first frequency such as in the range 25%–75%, or even lower, for example less than 10% of the first frequency. Next, in a step 205 the process returns to the step 201 where the motor is driven to the first speed again.

The pulsating sequence is repeated for as long as the vibration signal is to be given. For example, when the vibrating signal is given as an alert signal in a mobile telephone, the pulsating sequence is maintained until it is stopped, e.g. because the user of the mobile telephone answers a telephone call which has triggered the alert signal.

Figure 3A:
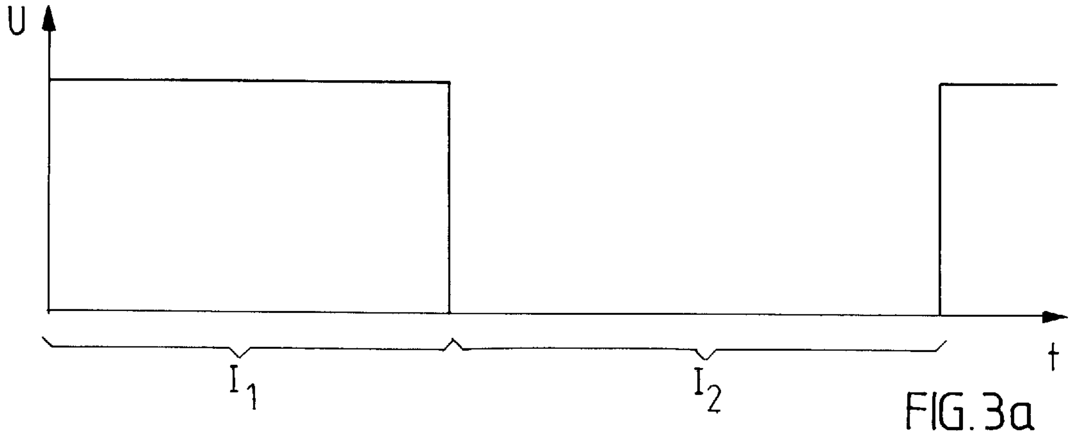
FIGS. 3*a*–3*c* show waveform diagrams.
Figure 3B:
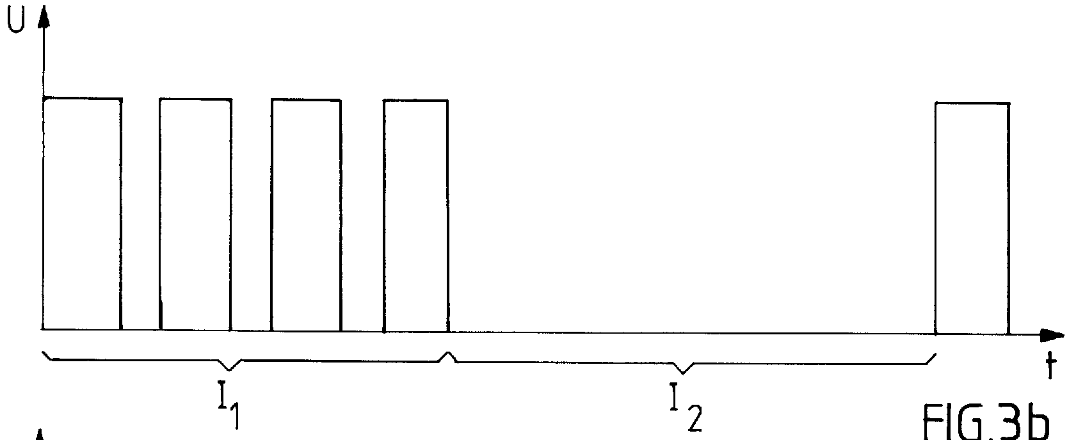
Figure 3C:
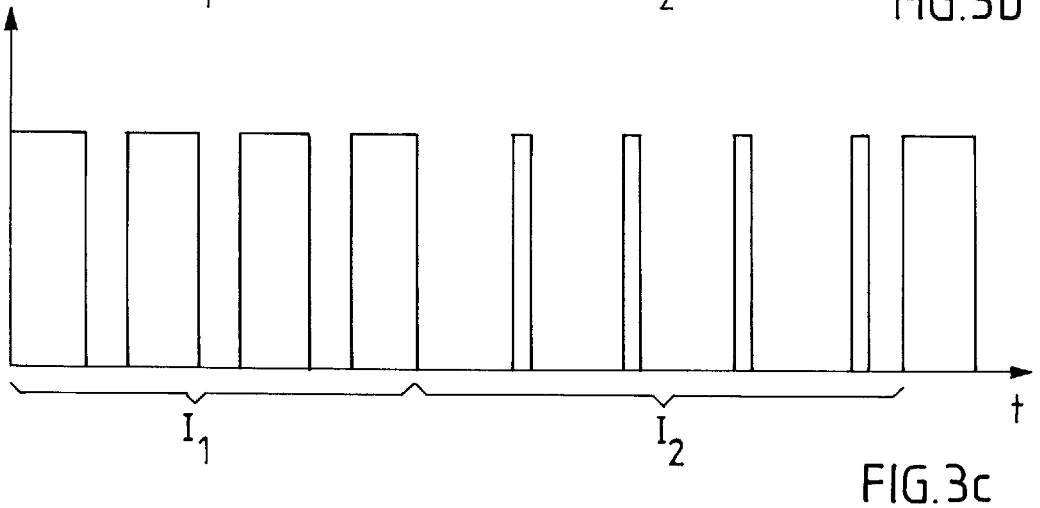

In FIGS. 3*a*–3*c*, different wave forms which can be applied to the motor are shown. Thus, in FIG. 3*a*, the motor is driven by a pulse train. A constant voltage is then applied to the motor during a first interval I1. The motor is then allowed to freewheel during a second interval I2 when the voltage is disconnected from the terminals of the motor.

In FIG. 3*b*, another wave form, which may be useful in some applications is shown. In FIG. 3*b* the wave form in FIG. 3*a* is pulse width modulated (PWM), thereby making it possible to control the speed of the motor during the first interval I1.

In FIG. 3*c*, yet another wave form is shown. In FIG. 3*c*, the drive signal to the motor is still pulse width modulated as in FIG. 3*b*. However, the voltage during the second interval is no longer zero. Instead, the power fed to the motor is reduced compared to the power fed to the motor during the first interval. This is obtained by controlling the modulation of the voltage applied to the motor terminals.

The signal shown in FIG. 3*c* can for example be advantageous to use in an application, where, in order to reduce the power consumption, the motor is driven to a speed corresponding to a frequency lower than the resonance frequency during the first interval, so that the motor will not freewheel past the resonance frequency during the second interval.

In such an application it can be particularly useful to let the variation between the highest motor speed and the lowest motor speed be large. Consequently, the variations in frequency of the vibrating device will vary within a broad range, which can be useful since such large variations can be easier to sense.

The intervals I1 and I2 can be controllable or be preset for each specific application. If the intervals I1 and I2 are preset, the interval I1 should be long enough for the motor to accelerate the eccentric mass to a desired frequency and the interval I2 should be long enough for the motor to retard the eccentric mass to a desired frequency.

In the case when the vibrator is controlled so that first the eccentric mass is accelerated to a frequency higher than the resonance frequency of the vibrator and then retarded to a frequency lower than said resonance frequency, the intervals I1 and I2 are set to suitable values. It is also possible to control the pulse width modulated signal so that a suitable amount of power is fed to the motor driving the eccentric mass.

For example, if the motor of the vibrator is driven using a signal as shown in FIG. 3*a*, and it is desired that the motor freewheels past the resonance frequency during the retardation thereof, a suitable value for the time interval I2 can be 0.10–4 seconds.

By using the method and the device as described herein and letting the frequency vary in a pulsating manner in the vibrating device, the vibration can be sensed more easily by a human, thereby making it possible to use a smaller mass in the vibrating device, than is possible with conventional vibrators. Hence a vibrator as described herein can be made having a small weight, while still making it possible to sense the vibration.

If the method of controlling a vibrator is used on conventional vibrators, it will be easier to sense them, which of course is an advantage.

Finally, the method of controlling a vibrator is not limited to a particular type of vibrator, but can be used for controlling any vibrator in order to make the vibration easier to sense.

What is claimed is:

1. A method of controlling a vibrator, comprising:

driving the vibrator towards a first frequency during a first time interval;

driving the vibrator towards a second frequency significantly lower than the first frequency during a second time interval, wherein the first frequency is higher than a resonant frequency of a combined vibrator-environment system during the first time interval and the second frequency is lower than the resonant frequency during the second time interval.

2. A method according to claim 1, wherein a sequence of the first and second time intervals is repeated.

3. A method according to claim 1, wherein the vibrator freewheels towards the second frequency during the second time interval.

4. A method according to claim 1, wherein the vibrator is driven using a voltage pulse train having predetermined voltages and durations.

5. A method according to claim 1, wherein the first time interval or the second time interval is preset.

6. A method according to claim 1, wherein the second time interval has a duration in the range 0.10–4 seconds.

7. A method according to claim 1, wherein the vibrator is driven using a pulse width modulated signal.

8. A method according to claim 1, wherein an order of the first and second intervals is interchanged.

9. A vibrator, comprising:

means for driving the vibrator first towards a first frequency during a first interval, where the first frequency is higher than a resonant frequency of a combined vibrator-environment system, and means for driving the vibrator towards a second frequency significantly lower than the first frequency during a second interval, where the second frequency is lower than the resonant frequency.

10. A vibrator according to claim 9, further comprising:

means for generating a sequence of alternating first and second intervals.

11. A vibrator according to claim 9, wherein the vibrator is arranged to freewheel towards a second frequency during the second interval.

12. A vibrator according to claim 9, wherein the vibrator is driven using a voltage pulse train having predetermined voltages and durations.

13. A vibrator according to claim 9, wherein the first interval or the second interval are preset.

14. A vibrator according to claim 9, wherein the second interval has a duration in the range 0.10–4 seconds.

15. A vibrator according to claim 9, wherein the vibrator is driven using a pulse width modulated signal.

16. A vibrator according to claim 9, wherein an order of the first and the second interval is interchanged.

17. A mobile telephone comprising a vibrator according to claim 9.

18. A pager comprising a vibrator according to claim 9.

19. A vibrator, comprising:

a driver for driving the vibrator first towards a first frequency during a first interval, where the first frequency is higher than a resonant frequency of a combined vibrator-environment system, and for driving the vibrator towards a second frequency significantly lower than the first frequency during a second interval, wherein the second frequency is lower than the resonant frequency.

20. A vibrator according to claim 19, wherein the driver includes means for generating a sequence of alternating first and second intervals.

21. A vibrator according to claim 19, wherein the vibrator is arranged to freewheel towards a second frequency during the second interval.

22. A vibrator according to claim 19, wherein the vibrator is driven using a voltage plus train having predetermined voltages and durations.

23. A vibrator according to claim 19, wherein the second interval has a duration in the range of 0.10–4 seconds.

24. A vibrator according to claim 19, wherein the vibrator is driven using a pulse width modulated signal.

25. A vibrator according to claim 19, wherein an order of the first and second interval is interchanged.

26. A mobile telephone comprising a vibrator according to claim 19.

27. A pager comprising a vibrator according to claim 19.

* * * * *